United States Patent
Ragan et al.

(10) Patent No.: US 10,589,935 B2
(45) Date of Patent: Mar. 17, 2020

(54) MOTORIZED PULLEY AND BELT-DRIVE SYSTEM

(71) Applicant: Laitram, L.L.C., Harahan, LA (US)

(72) Inventors: Bryant G. Ragan, Metairie, LA (US); Gilbert J. MacLachlan, Harahan, LA (US); David C. Weiser, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 2 days.

(21) Appl. No.: 16/068,732

(22) PCT Filed: Jan. 4, 2017

(86) PCT No.: PCT/US2017/012148
§ 371 (c)(1),
(2) Date: Jul. 9, 2018

(87) PCT Pub. No.: WO2017/123441
PCT Pub. Date: Jul. 20, 2017

(65) Prior Publication Data
US 2019/0016537 A1    Jan. 17, 2019

Related U.S. Application Data

(60) Provisional application No. 62/277,081, filed on Jan. 11, 2016.

(51) Int. Cl.
*B65G 23/08* (2006.01)
*B65G 23/22* (2006.01)
(Continued)

(52) U.S. Cl.
CPC ............ *B65G 23/08* (2013.01); *B65G 23/06* (2013.01); *B65G 23/22* (2013.01); *H02K 7/14* (2013.01); *H02K 21/24* (2013.01)

(58) Field of Classification Search
CPC .......... B65G 23/08; B65G 23/22; H02K 7/14; H02K 21/24
(Continued)

(56) References Cited

U.S. PATENT DOCUMENTS 6,244,427 B1 * 6/2001 Syverson ............... B65G 13/06
                                                     198/784
6,286,659 B1    9/2001 Petrovic
(Continued)

FOREIGN PATENT DOCUMENTS

DE    102008063788 A1    7/2010
EP        1671901 A1    6/2006
(Continued)

OTHER PUBLICATIONS

US 2010/0059341 A1, Itoh et al., Mar. 11, 2010.*
(Continued)

*Primary Examiner* — Douglas A Hess
(74) *Attorney, Agent, or Firm* — James T. Cronvich

(57) ABSTRACT

A motorized pulley mounted on a stationary shaft to drive a conveyor belt. The motorized pulley is constructed of an axial-flux motor in a housing connected to the motor's rotor. A driver including a drive ring has a drive surface mounted to the periphery of the housing to rotate with the rotor and the housing and drive a conveyor belt. The motor's stator is affixed to the shaft axially offset from the rotor.

21 Claims, 7 Drawing Sheets

(51) Int. Cl.
*H02K 7/14* (2006.01)
*H02K 21/24* (2006.01)
*B65G 23/06* (2006.01)

(58) Field of Classification Search
USPC .............................. 198/780, 832, 834, 835
See application file for complete search history.

(56) References Cited

U.S. PATENT DOCUMENTS

| | | | | |
|---|---|---|---|---|
| 6,450,325 | B1* | 9/2002 | Devnani | B65G 23/08 |
| | | | | 198/784 |
| 6,615,975 | B2* | 9/2003 | Ranger | B65G 13/071 |
| | | | | 198/781.08 |
| 6,710,505 | B1* | 3/2004 | Barani | B65G 13/06 |
| | | | | 198/784 |
| 6,737,778 | B2* | 5/2004 | Daikoku | H02K 7/1008 |
| | | | | 310/112 |
| 7,282,826 | B2* | 10/2007 | Langenberg | E21C 29/16 |
| | | | | 198/832 |
| 7,299,915 | B2* | 11/2007 | El-Ibiary | B65G 23/08 |
| | | | | 198/780 |
| 7,510,073 | B2* | 3/2009 | Kanaris | B65G 23/08 |
| | | | | 198/780 |
| 7,839,035 | B2* | 11/2010 | Hwaung | E06B 9/72 |
| | | | | 310/75 R |
| 8,102,095 | B2* | 1/2012 | Hoffmann | H02K 21/24 |
| | | | | 310/112 |
| 8,622,037 | B2 | 1/2014 | David et al. | |
| 9,061,833 | B2* | 6/2015 | Froebus | B65G 23/08 |
| 9,321,595 | B2* | 4/2016 | Wolters | B65G 23/08 |
| 9,440,796 | B2* | 9/2016 | Axmann | B65G 39/16 |
| 9,688,473 | B2* | 6/2017 | Reed | B65G 13/073 |
| 10,030,750 | B2* | 7/2018 | Biester | F16K 31/047 |
| 10,118,769 | B2* | 11/2018 | Reed | B65G 13/073 |
| 2008/0001488 | A1 | 1/2008 | Pyrhonen et al. | |
| 2009/0251024 | A1 | 10/2009 | Huppunen et al. | |
| 2009/0294255 | A1 | 12/2009 | Szarkowski et al. | |

FOREIGN PATENT DOCUMENTS

| | | |
|---|---|---|
| EP | 2061136 A1 | 5/2009 |
| EP | 2477316 A2 | 7/2012 |
| JP | H11168894 A | 6/1999 |
| WO | 596272 A | 12/1897 |
| WO | 9900317 A1 | 1/1999 |

OTHER PUBLICATIONS

Extended European Search Report, European Patent Application No. 17738746.1, dated Jul. 22, 2019, European Patent Office, Munich, Germany.

* cited by examiner

MOTORIZED PULLEY AND BELT-DRIVE SYSTEM

BACKGROUND

The invention relates generally to power-driven conveyors and more particularly to motorized pulleys and conveyor-belt drive systems.

Wide belt conveyors use long drive shafts on which drive pulleys or sprockets driving a conveyor belt are mounted. The drive shaft is conventionally rotated by a gear motor at one end of the shaft. When the belt is lightly loaded, the shaft 20 is true—untwisted as in FIG. 14A. But a high belt load creates a torsional load 22 in the shaft 20 that acts in an angular direction opposing the drive torque 24 at the drive end 27 of the shaft, as shown in FIG. 14B. The torsional load causes the drive shaft 20 to twist about its axis and creates a maximum angular deflection b of the shaft 20 between the drive end 27 and the opposite end 26 of the shaft. Angular deflection of the shaft 20 changes the phases of sprocket teeth along the length of the shaft from the phase of the sprocket closest to the drive end 27. Shaft twist can cause improper engagement of the sprocket teeth with the conveyor belt.

SUMMARY

One version of a motorized pulley embodying features of the invention comprises an axial-flux motor having a rotor rotatable about an axis of rotation and a stator axially offset from the rotor across a gap between the stator and a side of the rotor. A driver for engaging a belt is coupled to the rotor to rotate about the axis of rotation with the rotor.

In another aspect a drive system embodying features of the invention comprises a stationary shaft defining an axis along its length and a motorized pulley. The pulley includes an axial-flux motor mounted on the stationary shaft. The motor has a rotor rotatable about the axis and a stator affixed to the stationary shaft and axially offset from the rotor across a gap between the stator and a side of the rotor. A driver coaxial with and coupled to the rotor rotates about the axis with the rotor to drive an engaged belt.

DETAILED DESCRIPTION

Figure 1:
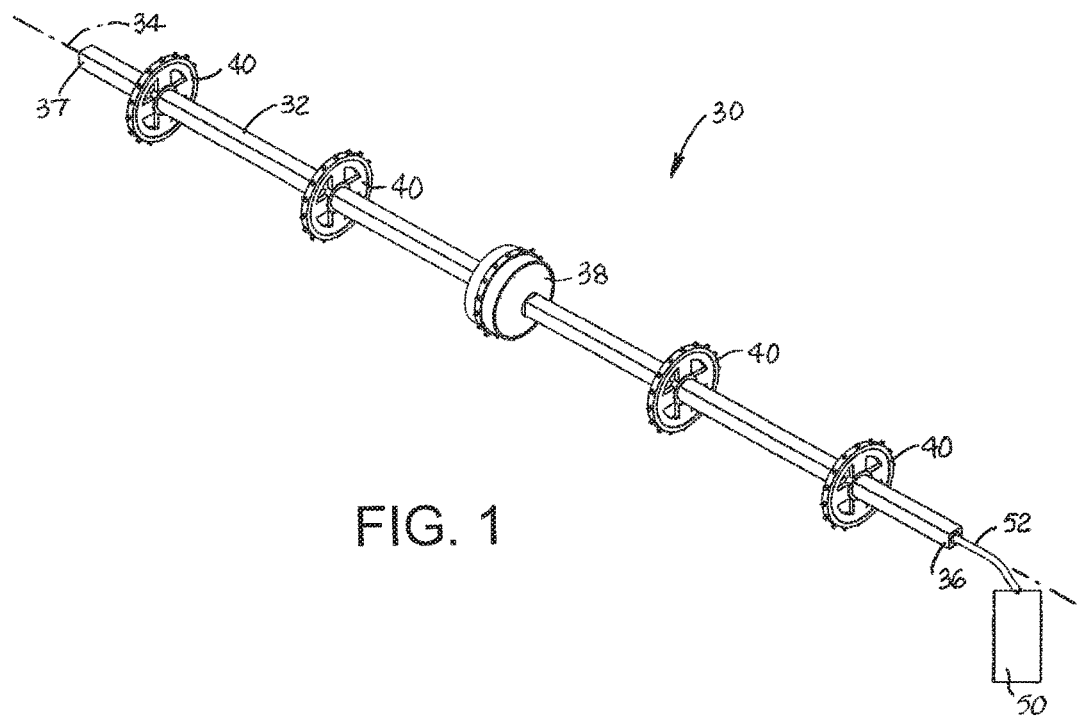
FIG. 1 is an isometric view of a drive system embodying features of the invention including a motorized sprocket.

FIG. 1 shows a conveyor-belt drive system embodying features of the invention. The drive system 30 comprises a stationary, i.e., non-rotating, shaft 32 extending in length along an axis 34 from a first end 36 to an opposite second end 37. Affixed near the center of the shaft 32 is a motorized sprocket 38. The motorized sprocket 38 is flanked by axially spaced idler sprockets 40 or pulleys mounted on the shaft 32 to rotate about the shaft's axis 34. Together, the motorized sprocket 38 and the idler sprockets 40 engage and support a conveyor belt. And, unlike with conventional end-driven sprockets, a gearbox is not needed.

Figure 2:
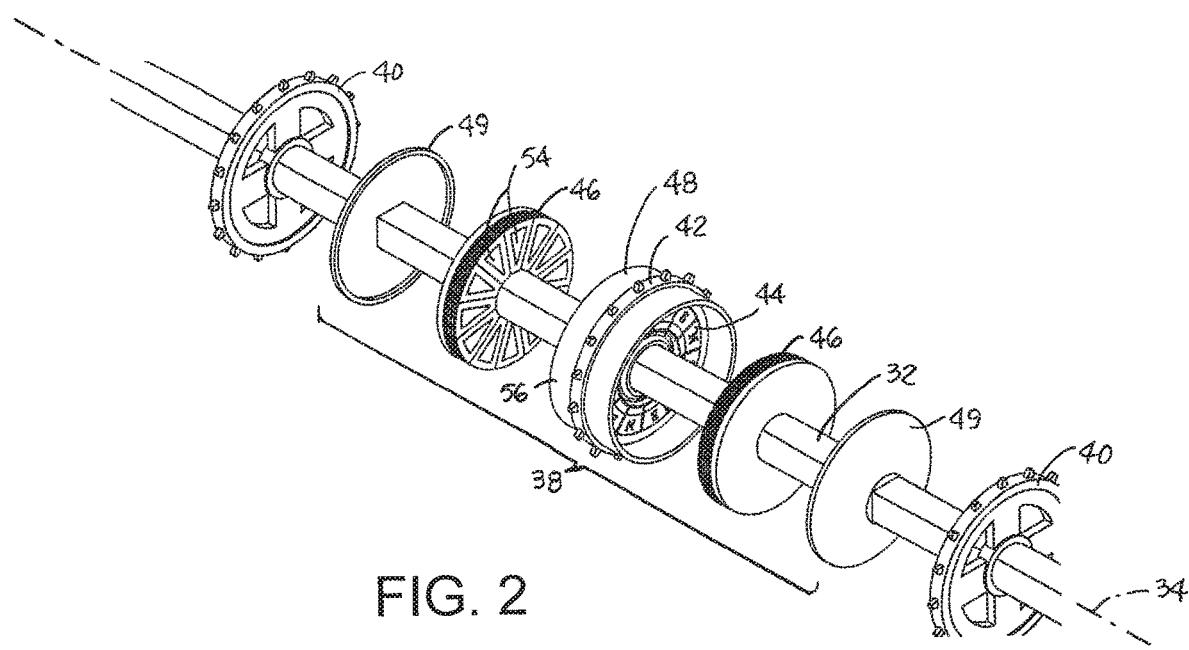
FIG. 2 is a partly exploded isometric view of a portion of the drive system of FIG. 1.

As shown in FIG. 2, the motorized sprocket 38 comprises a driver in the form of a drive ring 42 driven by an axial-flux motor having, in this example, a permanent-magnet rotor 44 flanked on opposite sides by stators 46. The rotor 44 and the stators 46 are enclosed in a tubular housing 48. End lids 49 seal the housing 48. The stators 46 are affixed to the stationary shaft 32 and do not rotate. In this compact arrangement the axial length of the motorized sprocket from end lid to end lid is less than its diameter measured at the driver. The stators 46 are energized by a motor controller 50 (FIG. 1) over electrical wiring 52 that extends through a passageway in the shaft 32 to the stators. Shafts having other geometries, such as round, polygonal, I-beam, L-beam, or V-beam, can alternatively be used. The wiring 52 could alternatively extend along the outside of the shaft. For the L-, I-, and V-beam shafts, for example, the wiring could run along an interior corner of the beam. The stators 46, which are axially spaced from the sides of the rotor 44 by a small air gap on each side, produce a magnetic flux wave directed axially from a circular array of stator poles 54. The flux wave circles the axis 34 of the shaft 32 and causes the permanent-magnet rotor 44 to rotate about the shaft's axis, which is the axis of rotation of the rotor. The drive ring 42, which is mounted to the periphery 56 of the tubular housing 48, which is, in turn, affixed to the rotor 44, rotates about the shaft's axis 34 with the rotor. But the driver could be part of the rotor, or it could be attached directly to the circumferential periphery of the rotor. The outer diameter of the stators 46 is less than the inner diameter of the tubular housing 48. In that way the housing 48 can rotate about the stationary stators 46 without contact.

Figure 3:
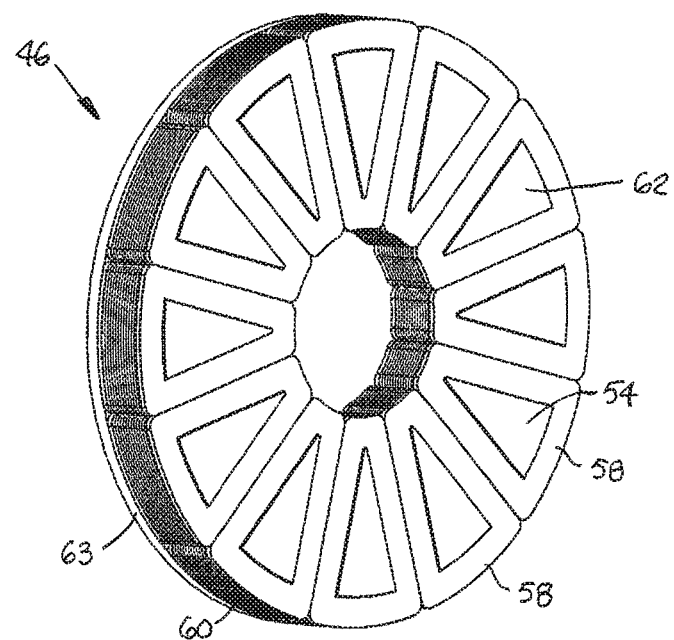
FIG. 3 is an isometric view of the stator of an axial-flux motor in the drive system of FIG. 1.
Figure 4:
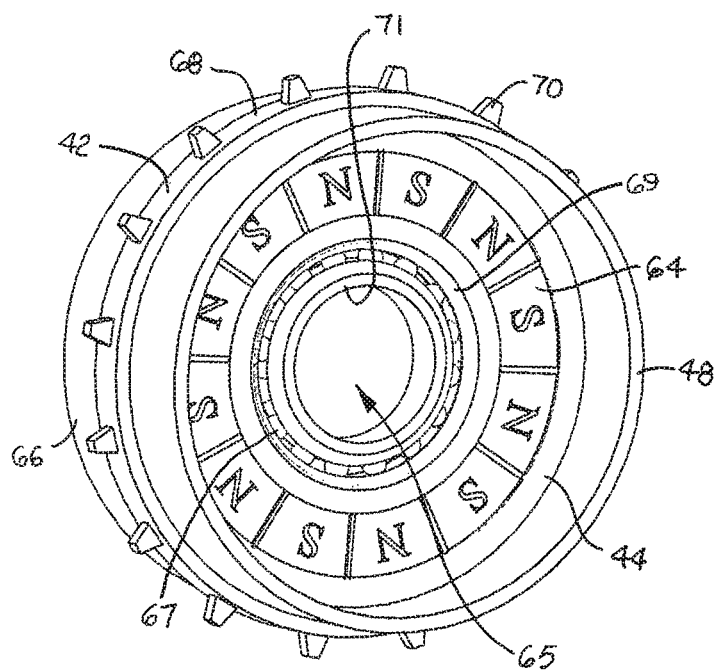
FIG. 4 is an isometric view of a permanent-magnet rotor of an axial-flux motor in the drive system of FIG. 1.

The stator 46 and the rotor 44 are shown in more detail in FIGS. 3 and 4. The stator 46 comprises an array of wound coils 60. Each coil 60 is constructed of copper wire wound on a wedge-shaped plastic bobbin 58 that surrounds a stator pole 54 constructed of a stack of laminations forming an outwardly facing wedge-shaped pole face 62. The stack of laminations extends through the bobbin 58 from an iron backing 63 to complete the magnetic circuit. The rotor 44, which is attached to the inside of the cylindrical tubular housing 48, has a circular array of alternating permanent-magnet poles N, S. The pole faces 64 face axially outward from each side to couple to the magnetic flux wave produced by the closely spaced stators 46. The rotor 44 has a central bore 65. A roller bearing 67 is received in the bore 65. The bearing's outer ring 69 is affixed to the rotor 44. The bearing's inner ring 71 is attached to the shaft. In the case of a square shaft as in FIG. 2, the inner ring is attached to the shaft 32 by a circle-to-square adapter (not shown). Other adapters are used for shafts of other shapes. The drive ring 42 is mounted to the outer side 66 of the housing 48. The drive ring has an outer drive surface 68 that contacts a conveyor belt. In this example, the drive ring 42 is a sprocket ring with drive teeth 70 circumferentially spaced along the outer drive surface 68. But the drive ring could be toothless and its outer drive surface could be V-shaped to form a pulley sheave for driving a V belt. Or the drive ring could be toothless with a generally smooth cylindrical outer drive surface for driving a flat belt. Consequently, the term "motorized pulley" as used in this description and in the claims is meant to encompass motorized sprockets, motorized sheaves, and motorized cylindrical rollers.

Figure 5:
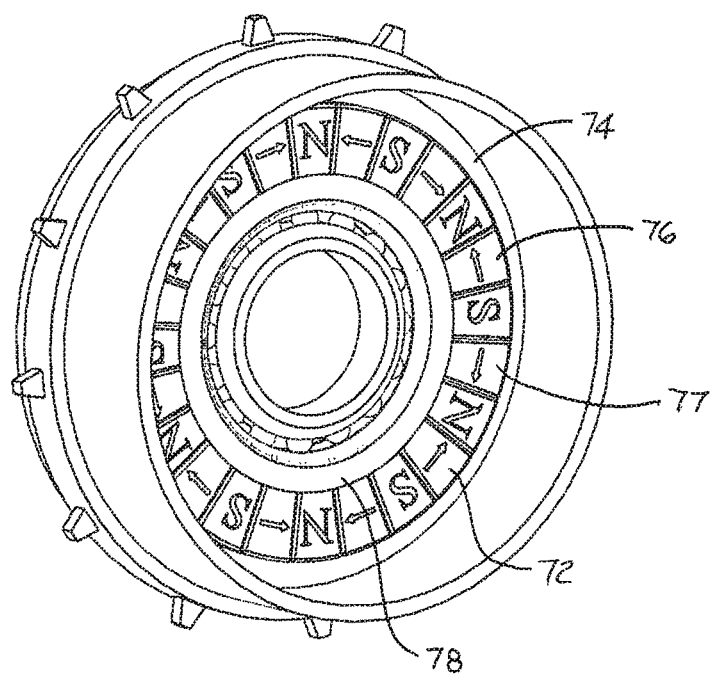
FIG. 5 is an isometric view of a permanent-magnet rotor with magnets arranged in a Halbach array for use in an axial-flux motor in the drive system of FIG. 1.

The permanent-magnet rotor 44 of FIG. 4 is replaced by permanent magnets arranged in a Halbach array 72 in the rotor 74 of FIG. 5. The alternating magnet poles S, N alternate with magnets 76, 77 whose poles are orthogonal to the N and S poles. The result is a strengthening of the magnetic field axially outward of the facing side 78 of the rotor 74 and a corresponding weakening of the field extending axially outward of the obverse side. With the Halbach-array rotor 74, a single stator closely spaced from the outward facing side 78 in FIG. 5 is used to form a slenderer permanent-magnet axial-flux motor.

Figure 6:
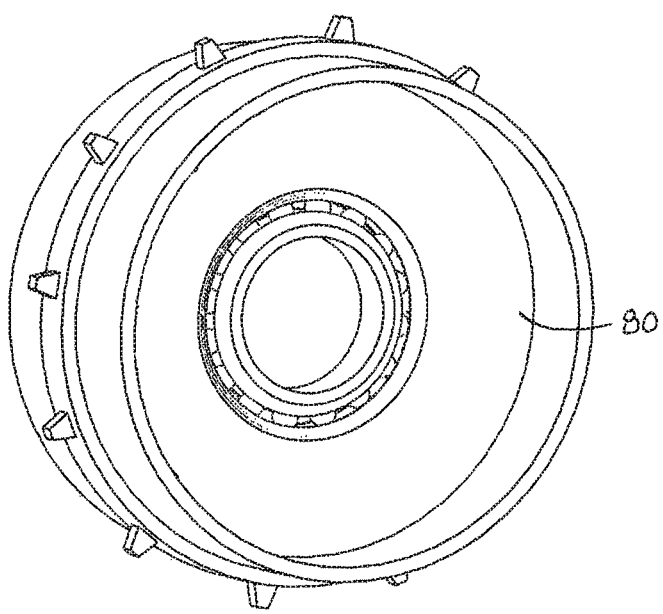
FIG. 6 is an isometric view of an electrically conductive rotor for use in an axial-flux induction motor in the drive system of FIG. 1.

In FIG. 6 the rotor 80 is a disk made of an electrically conductive material. The rotating magnetic flux wave produced by the stator or stators induces currents in the electrically conductive rotor 80. The induced currents produce magnetic fields that interact with the flux wave and cause the rotor 80 to rotate. The stator or stators and electrically conductive rotor form an axial-flux induction motor.

Figure 7:
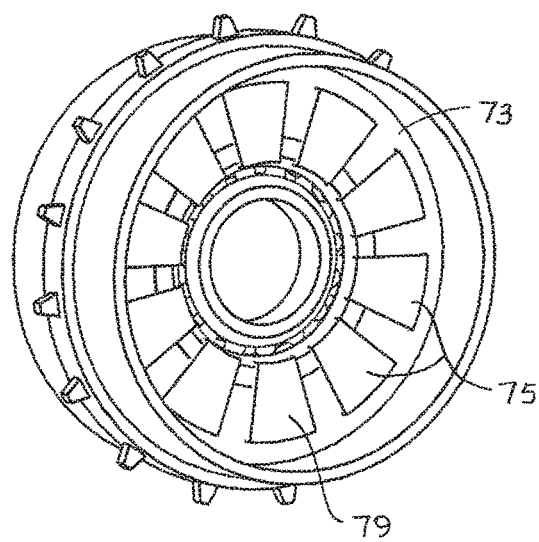
FIG. 7 is an isometric view of a switched-reluctance rotor for use in an axial-flux switched-reluctance motor in the drive system of FIG. 1

A switched-reluctance rotor 73 is shown in FIG. 7. The rotor 73 shown in the example has ten poles 75 made of a soft magnetic material, such as laminated steel. The poles 75 are arranged around the rotor 73 with pole faces 79 facing axially outward toward the stator or stators. When the axial-flux stator is energized, the rotor's magnetic reluctance creates a force that urges a rotor pole 75 into alignment with the closest energized stator pole. The controller energizes the stator poles in sequence with a switching waveform to create a traveling magnetic flux wave maintaining rotation of the rotor 73.

Figure 8:
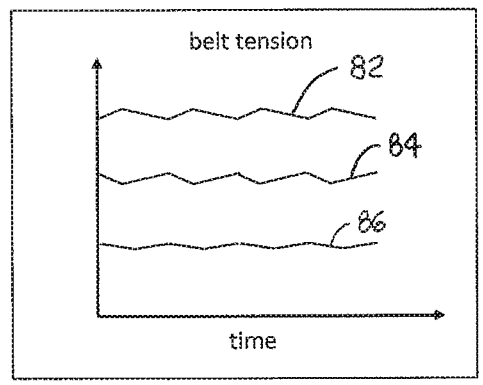
FIG. 8 is a graphical representation of the effects of chordal action and permanent-magnet axial-flux motor cogging on belt tension.
Figure 9:
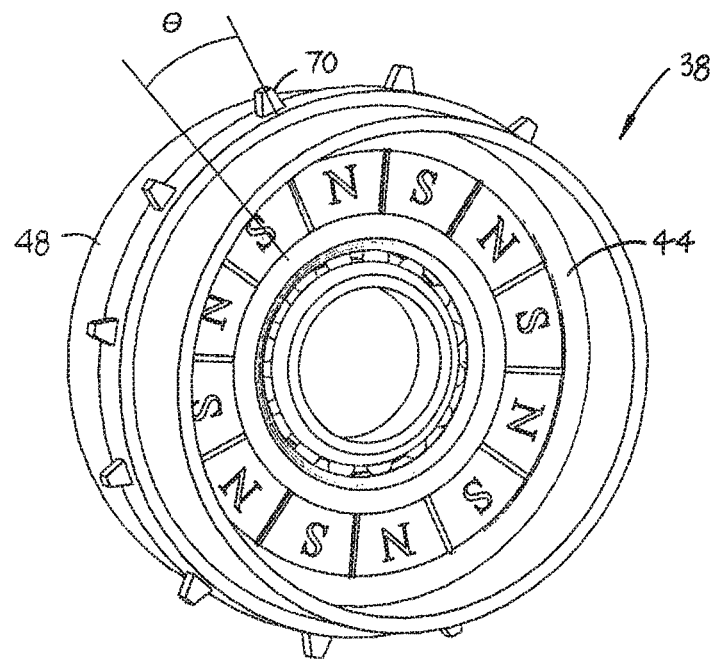
FIG. 9 is an isometric view of a rotor as in FIG. 4 showing phasing of the drive teeth relative to the rotor.

Because modular conveyor belts are made of rigid modules, they can bend only at their hinge joints when engaged with a sprocket. The result is a rise and fall in the belt's conveying surface and a regular variation in the belt's speed and tension. As shown in FIG. 8, the uncompensated tension 82 in a modular belt driven by a sprocket rotating at a constant speed shows a regular variation as a result of chordal action. A permanent-magnet axial-flux motor in the motorized pulley or sprocket 38 of FIG. 9 can be used to compensate for the variation in belt tension and speed due to chordal action. When operated at relatively low speeds, permanent-magnet motors cog. Cogging is the tendency of the permanent magnets in the rotor 44 to seek positions relative to the stator poles that minimize the reluctance of the magnetic circuit. The result is a variation in the torque and rotational speed of the sprocket. That variation in torque can be used to vary the tension the sprocket can impart to the belt. The cogging tension 84 can be adjusted to compensate for chordal action 82 by arranging the phase θ of the drive teeth 70 on the drive ring 48 relative to the magnet poles S, N. So, by having the same number of sprocket teeth 70 as stator poles and by properly phasing the teeth to the poles, the normally undesirable effects of cogging can be used to compensate for the normally undesirable effects of chordal action to produce a compensated belt tension characteristic 86 with less variation in belt speed. Cogging can be used to compensate for chordal action especially if the numbers of teeth, rotor poles, and stator poles are the same or are related as integral multiples. For example, the motorized sprocket could have twelve sprocket teeth, twelve stator poles, and twelve, six, four, three, or two rotor poles.

Figure 10:
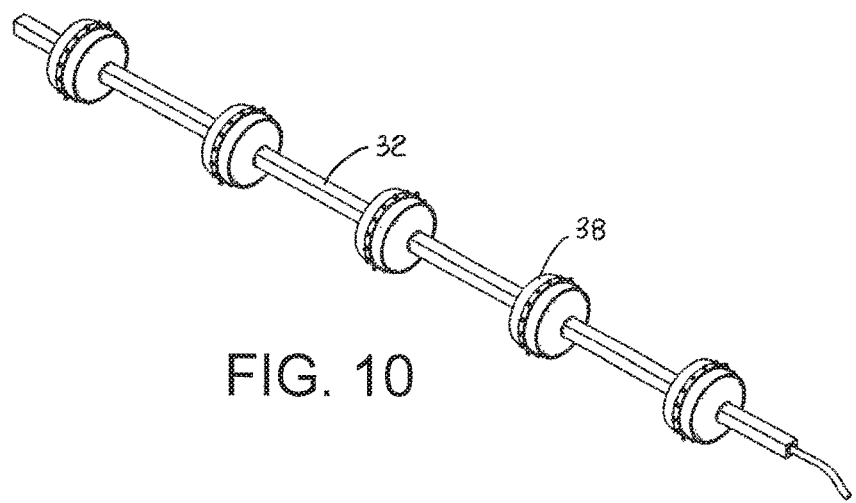
FIG. 10 is an isometric view of a conveyor-belt drive system having multiple motorized sprockets axially spaced across the width of a drive shaft.

FIG. 10 shows a drive system in which motorized pulleys 38 are mounted at axially spaced locations along the length of the stationary shaft 32. This system is useful in driving wide belts or heavier loads.

Figure 11:
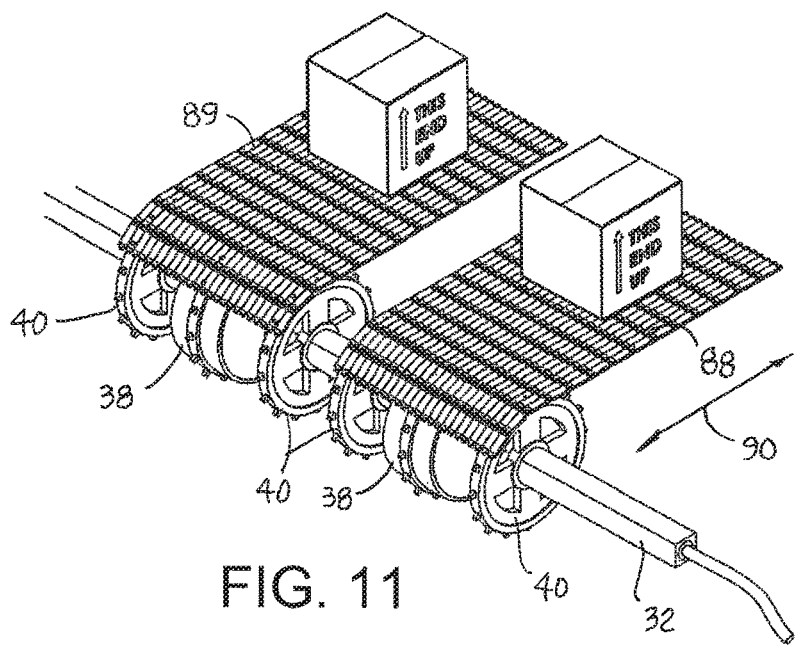
FIG. 11 is an isometric view of the drive end of a belt conveyor with two belts each driven by a separate motorized sprocket as in FIG. 1.

Because the shaft 32 is stationary, multiple motorized pulleys 38 can be used to drive multiple belts in parallel at different speeds or in opposite directions, as shown in FIG. 11. The stationary shaft 32 shown in this example has two motorized pulleys 38, each driving an individual conveyor belt 88, 89, in a direction of belt travel 90. The belts are also shown supported on their undersides by pairs of idler sprockets 40 freely rotatable about the axis of the shaft 32. The motorized pulleys 38 can be controlled over associated control lines to operate at different speeds or even in opposite directions. With adjacent belts 88, 89 closely spaced, the drive system can be useful in singulating and case-turning applications.

Figure 12:
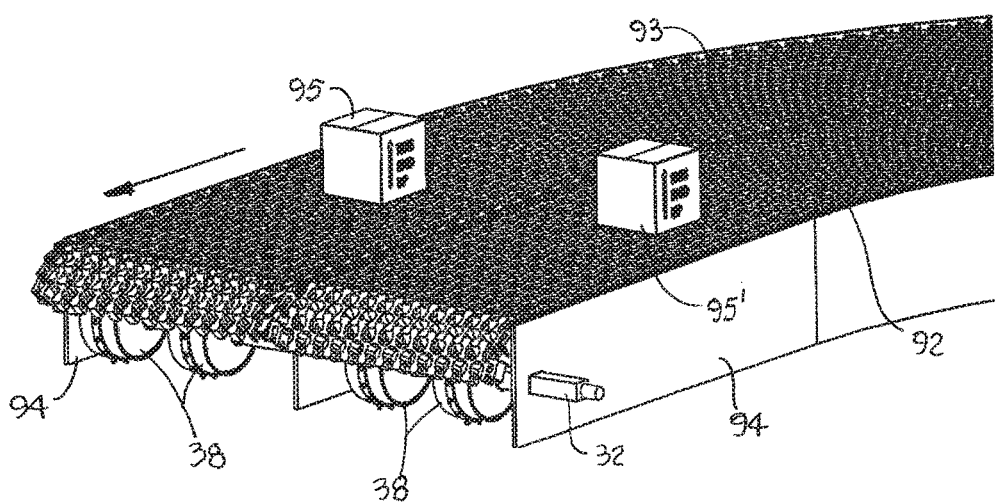
FIG. 12 is an isometric view of the drive end of a radius-belt conveyor with two conveyor belts driven at different speeds by separate motorized sprockets.

A multiple motorized-pulley drive system is shown in FIG. 12 in a radius application. Two side-by-side radius conveyor belts 92, 93 are shown in a turn. Each belt is supported and driven off two collinear shafts or the same stationary shaft 32, whose ends are supported in opposite sides of a conveyor frame 94. In this example each belt 92, 93 is driven by a pair of motorized pulleys 38 mounted on the shaft 32. Because the outer belt 93 travels a longer path than the inner belt 92, it is driven at a greater speed than the inner belt by the motorized pulleys. In this way articles 95, 95' will have the same travel time whether they are on the inner belt 92 or the outer belt 93.

Figure 14A:
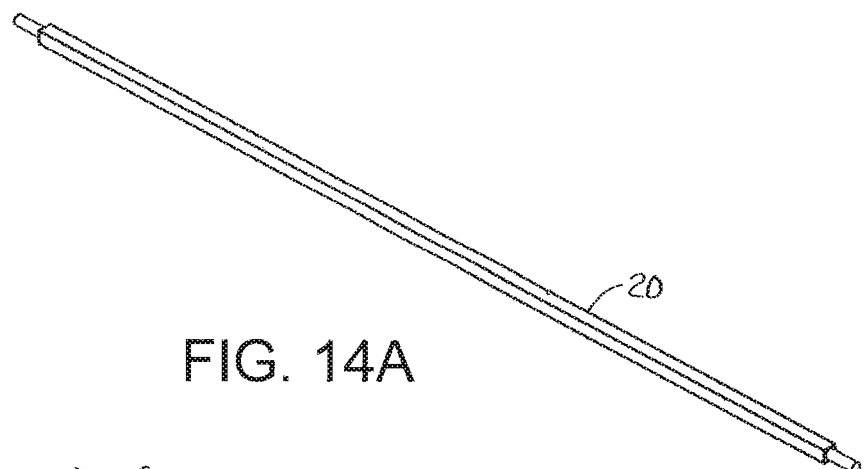
FIG. 14A is an isometric view of a long rotatable drive shaft for a conventional drive system.
Figure 14B:
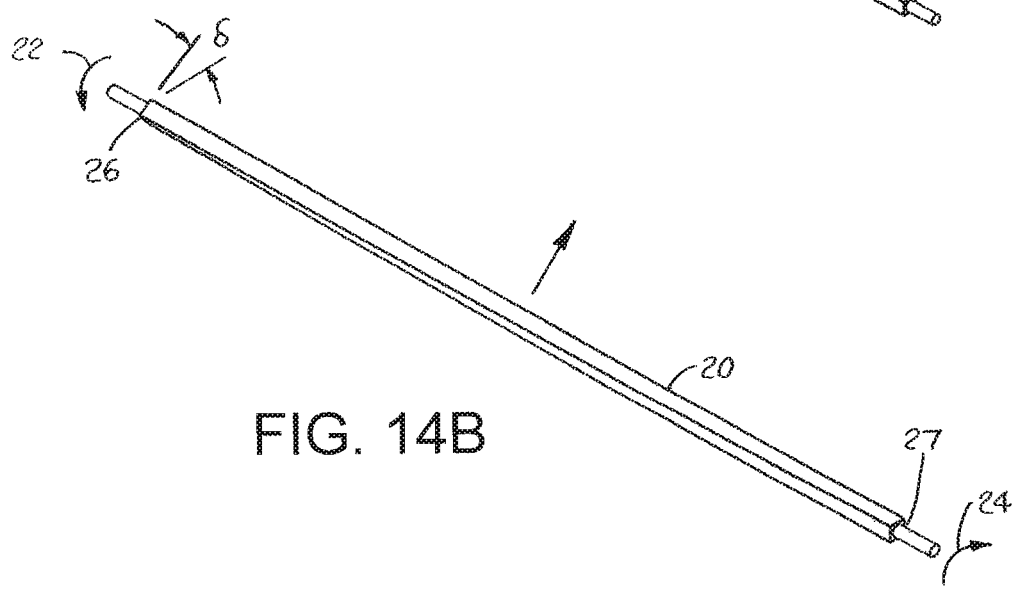
FIG. 14B is an isometric view of the drive shaft of FIG. 14A driven at one end and twisted along its length under a heavy load.
Figure 13:
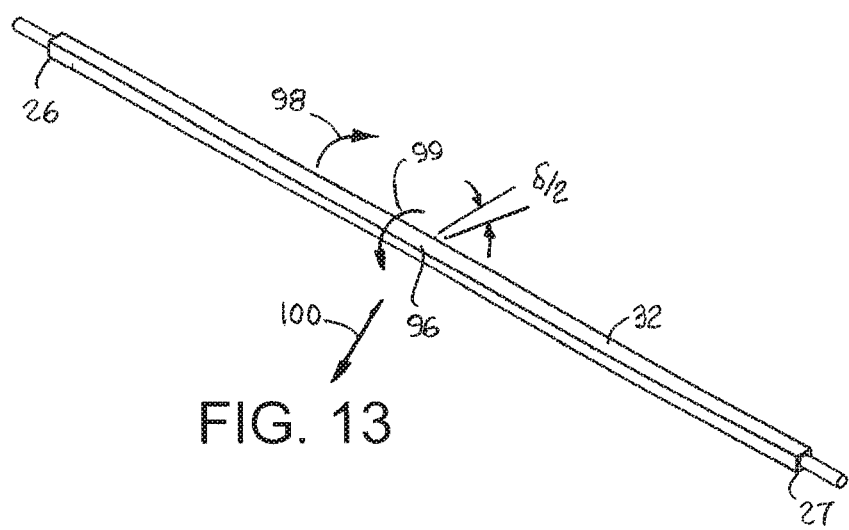
FIG. 13 is an isometric view of a stationary drive shaft under heavy load and driven by a motorized sprocket at the center of the shaft.

If a motorized pulley is mounted at the middle 96 of the stationary shaft 32 as in FIG. 13 and is used to drive a heavily loaded belt, the maximum shaft twist δ/2 is half that of the same-length, end-driven shaft 20 of FIG. 14B under the same load and drive conditions. Because the torsional load 98 opposes the drive torque 99, the ends 26, 27 of the shaft twists opposite the direction of belt travel 100 relative to the middle 96 of the shaft.

What is claimed is:
1. A motorized pulley comprising:
an axial-flux motor having a rotor rotatable about an axis of rotation and a stator axially offset from the rotor across a gap between the stator and a side of the rotor;
wherein the stator includes an array of coils producing an axially directed magnetic flux wave interacting with the rotor and causing the rotor to rotate;
a driver for engaging a belt, wherein the driver is coupled to the rotor to rotate about the axis of rotation with the rotor.

2. A motorized pulley as in claim 1 wherein the driver includes a drive ring having an outer drive surface.

3. A motorized pulley as in claim 2 wherein the drive ring has drive teeth circumferentially spaced along the outer drive surface.

4. A motorized pulley as in claim 2 wherein the outer drive surface of the drive ring is radially outward of the rotor.

5. A motorized pulley as in claim 1 wherein the axial-flux motor has a second stator axially spaced from an opposite second side of the rotor across a second gap.

6. A motorized pulley as in claim 1 wherein the rotor is a disk made of an electrically conductive material to form an axial-flux induction motor with the stator.

7. A motorized pulley as in claim 1 wherein the rotor includes a plurality of circumferentially disposed permanent magnets along the side of the rotor to form an axial-flux permanent-magnet motor with the stator.

8. A motorized pulley as in claim 1 wherein the rotor has a plurality of rotor poles having axially outward pole faces to form an axial-flux switched-reluctance motor with the stator.

9. A motorized pulley as in claim 1 further comprising a tubular housing for the axial-flux motor.

10. A motorized pulley as in claim 9 wherein the driver includes a drive ring on the outer side of the tubular housing.

11. A motorized pulley as in claim 1 wherein the stator has stator poles, the rotor has permanent-magnet poles, and the driver includes a drive ring having an outer drive surface and drive teeth on the outer drive surface and wherein the number of stator poles and the number of drive teeth are the same.

12. A motorized pulley as in claim 1 having an axial length and a diameter, wherein the axial length of the motorized pulley is less than its diameter.

13. A belt drive system comprising:
a stationary shaft defining an axis along its length; and
a motorized pulley including:
an axial-flux motor mounted on the stationary shaft and having a rotor rotatable about the axis and a stator affixed to the stationary shaft and axially offset from the rotor across a gap between the stator and a side of the rotor;
wherein the stator includes an array of coils producing an axially directed magnetic flux wave interacting with the rotor and causing the rotor to rotate;
a driver for engaging a belt, wherein the driver is coaxial with and coupled to the rotor to rotate about the axis with the rotor.

14. A belt drive system as in claim 13 further comprising a plurality of motorized pulleys mounted on the stationary shaft at axially spaced locations.

15. A belt drive system as in claim 13 further comprising one or more idler pulleys rotatably mounted on the stationary shaft for rotation about the axis.

16. A belt drive system as in claim 13 further comprising a tubular housing for the axial-flux motor, the tubular housing having an outer periphery.

17. A belt drive system as in claim 16 further comprising first and second end lids mounted on the stationary shaft at opposite first and second ends of the tubular housing to seal the tubular housing.

18. A belt drive system as in claim 13 further comprising a roller bearing mounted to the stationary shaft and wherein the rotor has a central bore receiving the roller bearing.

19. A belt drive system as in claim 13 wherein the stationary shaft has a passageway to admit electrical wiring to the stator.

20. A belt drive system as in claim 13 comprising first and second motorized pulleys mounted on the stationary shaft at axially offset locations, a first motor controller controlling the speed and direction of the first motorized pulley, and a second motor controller controlling the speed and direction of the second motorized pulley, wherein the first motorized pulley drives a first belt and the second motorized puller drives a second belt.

21. A belt drive system as in claim 20 wherein the first belt is a radius belt at the inside of a turn and the second belt is a radius belt at the outside of the turn and wherein the second motor controller runs the second motorized pulley at a greater speed than the first motor controller runs the first motorized pulley.

* * * * *